United States Patent [19]

Makino et al.

[11] Patent Number: 4,994,973

[45] Date of Patent: Feb. 19, 1991

[54] CONTROL SYSTEM FOR INDUSTRIAL USE VEHICLES

[75] Inventors: Noriaki Makino, Shiga; Sampei Kikuchi, Kyoto, both of Japan

[73] Assignee: Nippon Yusoki Co., Ltd., Nagaokakyo, Japan

[21] Appl. No.: 454,975

[22] Filed: Dec. 22, 1989

[30] Foreign Application Priority Data

Dec. 28, 1988 [JP] Japan ........ 63-331098
Dec. 28, 1988 [JP] Japan ........ 63-331099

[51] Int. Cl.[5] ........ G06F 15/20

[52] U.S. Cl. ........ 364/424.07; 414/273

[58] Field of Search ........ 364/424.07, 424.03, 364/424.04, 424.05; 307/10.7; 414/273, 274, 632-638; 318/568.24, 568.25; 180/53.4, 904, 6.24, 6.28; 280/6.12; 340/461, 462

[56] References Cited

U.S. PATENT DOCUMENTS 4,354,568 10/1982 Griesenbrock ........ 364/424.07
4,376,298 3/1983 Sokol et al. ........ 364/424.07
4,520,419 5/1985 Locher et al. ........ 307/10.7
4,547,844 10/1985 Adam ........ 364/424.07
4,742,468 5/1988 Ohashi et al. ........ 414/273

*Primary Examiner*—Parshotam S. Lall
*Assistant Examiner*—Tyrone Queen
*Attorney, Agent, or Firm*—Cushman, Darby & Cushman

[57] ABSTRACT

A control system for industrial use vehicles such as battery powered fork lifts in which regenerative energy is saved when the direction of travel is reversed. The control system functions to moderate the current drain on the battery. The control system comprising: a travel signal input means for generating an output signal from a travel accelerator, a cargo-handling signal input means for generating a cargo-handling signal, a monitor voltage input means for detecting a voltage at each of a plurality of monitor points and for outputting a detected signal, a sensor input means for generating an output signal from each sensor, monitor input means for generating an output signal from each monitor, and a microprocessor controller for receiving the output signals of the respective means and for outputting predetermined control signals.

18 Claims, 7 Drawing Sheets

CONTROL SYSTEM FOR INDUSTRIAL USE VEHICLES

BACKGROUND OF THE INVENTION

1. Field of the Invention

The present invention relates to a travel, cargo-handling, electric power steering, and battery liquid level monitor control system for industrial use vehicles (hereinafter referred to as a battery driven fork-lift truck) in which a regenerative battery recharging broke mode is provided when the travel direction is reversed. When an abnormal operating condition is detected an appropriate trouble message is displayed on a display screen by a microcomputer indicating the location of the abnormal condition.

2. Prior Art

In a conventional control system, individual control units are provided for travel, cargo-handling and power steering. To prevent interference between travel, cargo-handling, steering, and monitor display control circuitry, prior art control systems require multiple sensors and terminals for signal transmission/reception. Furthermore, the circuitry must be interconnected by many different individual control units. Accordingly, prior art control systems are complicated in construction and inherently involve the following problems:

(1) Because individual control units are used, it is difficult to prevent interference between them and combining them into a system is difficult.

(2) When travel and cargo-handling are concurrently performed, a large current flows and hence battery voltage drops. Insufficient motor power and instable control results.

(3) During braking kinetic energy is not reconverted into electric energy. In this respect, poor energy saving is attained. The large current flow through the motor tremendous brush and commutator wear. When energy regeneration is used in the prior art, an automatic regenerative/power travel check system with a very high response or a high operation feeling is required.

(4) A number of contacts to open and close circuits are used and full power activates these contacts. When these are activated, energy saving is not possible The large amount of heat generated also causes physical size of the contacts to be large and consumes a large amount of space. This is problematic when the components are mounted.

(5) Because individual control units are used to check whether or not parts are functioning normally or whether parts need maintenance, a single monitor of all the control units is impossible. Furthermore, prior art systems do not provide detailed monitor data in an easy-to-understand data format.

SUMMARY OF THE INVENTION

It is an object of the present invention to overcome the above-mentioned problems with prior art systems.

It is another object of the present invention to provide a control system for industrial use vehicles in which a trouble location is displayed on a display screen under microcomputer control.

According to the present invention, there is provided a control system for industrial use vehicles comprising: travel signal input means for generating an output signal from a travel accelerator; cargo-handling signal input means for generating a cargo-handling signal; monitor voltage input means for detecting a voltage at each of a plurality of monitor points and for outputting the detected signals; sensor input means for generating an output signal from each of a plurality of sensor(s); monitor input means for generating an output signal from each monitor; and a microprocessor controller for receiving the output signals of the respective means and for outputting predetermined control signals.

When receiving signals from the travel signal input means and the cargo-handling signal input means, the microprocessor controller sets a reference time point in a fixed period generated therein at an OFF point of one of the travel signal or the cargo-handling signal, and sets at an ON point of the other.

The microprocessor controller also receives the output signal from the travel signal input means, and checks whether or not a plugging current exceeds a preset value within a predetermined period when a travel chopper starts to operate. If the plugging current exceeds the preset valve, the controller produces a control signal to select a regenerative braking mode.

The microprocessor controller is powered from of a battery contained in the monitor voltage input means. The microprocessor therefore produces a control signal to apply a fixed average exciting voltage to an exciting coil of each contact even if the main vehicle battery voltage varies.

BRIEF DESCRIPTION OF THE DRAWINGS

Other objects, features and advantages of the present invention will be apparent from the following description taken connection with the accompanying drawings, in which:

FIGS. 8 and 9 are circuit diagrams of contact choppers;

FIG. 10 shows a front view of a display panel in which a display window displays the normal operating condition of the fork-lift; and FIG. 11 shows a front view of a display panel in which a display window displays an operating condition and an associated message.

DETAILED DESCRIPTION OF THE PREFERRED EMBODIMENTS

A preferred embodiment of the control system for industrial use vehicles is described with reference to FIGS. 1 through 11.

Figure 1:
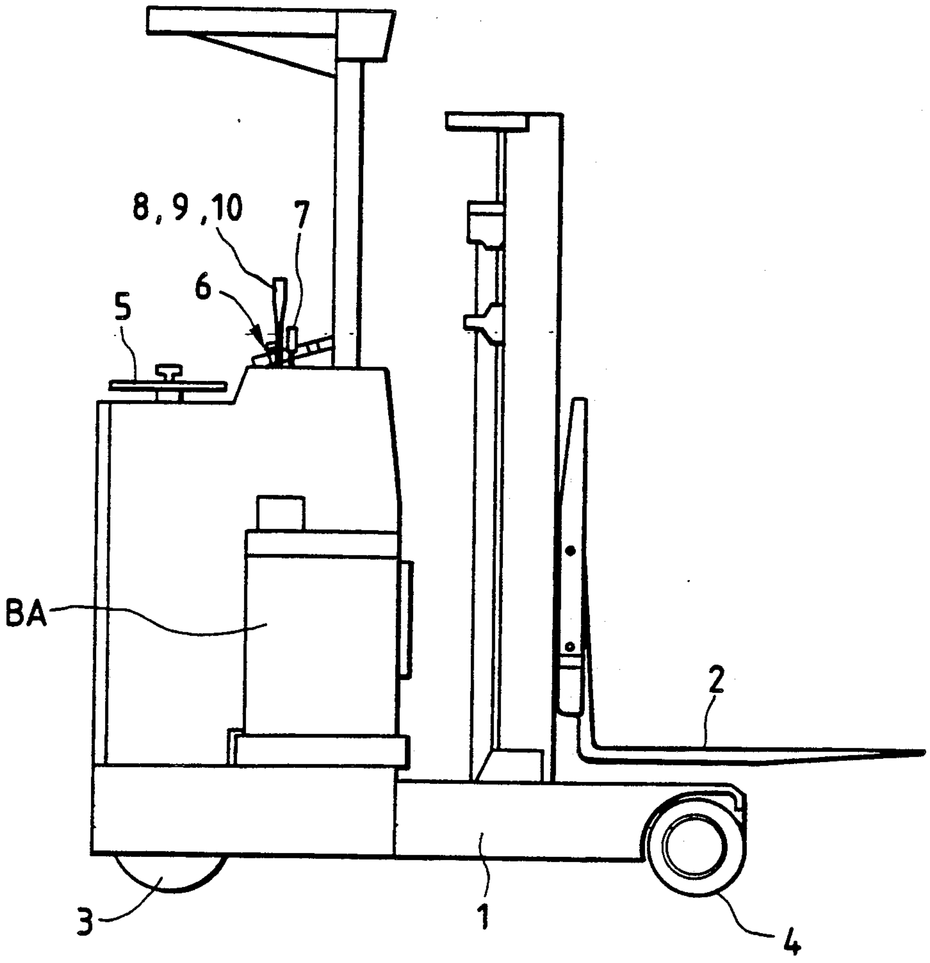
FIG. 1 shows a side view of a battery driven fork-lift truck incorporating a control system according to the present invention.

FIG. 1 shows a side view of a battery driven fork-lift truck incorporating the control system of the present invention. Reference numeral 1 designates a vehicle body; 2, a fork for cargo-handling, which is lifted by oil pressure; 3, a drive wheel; 4, a load wheel; 5, a steer handle; 6, a display panel for displaying monitor data and defective parts data, and the like; BA indicates a battery. Although not illustrated, a circuit board including a travel main circuit, a cargo-handling main circuit, a power steering main circuit, a control circuit containing a microprocessor (MPU), and various types of sensors are mounted on the vehicle body 1.

Figure 2:
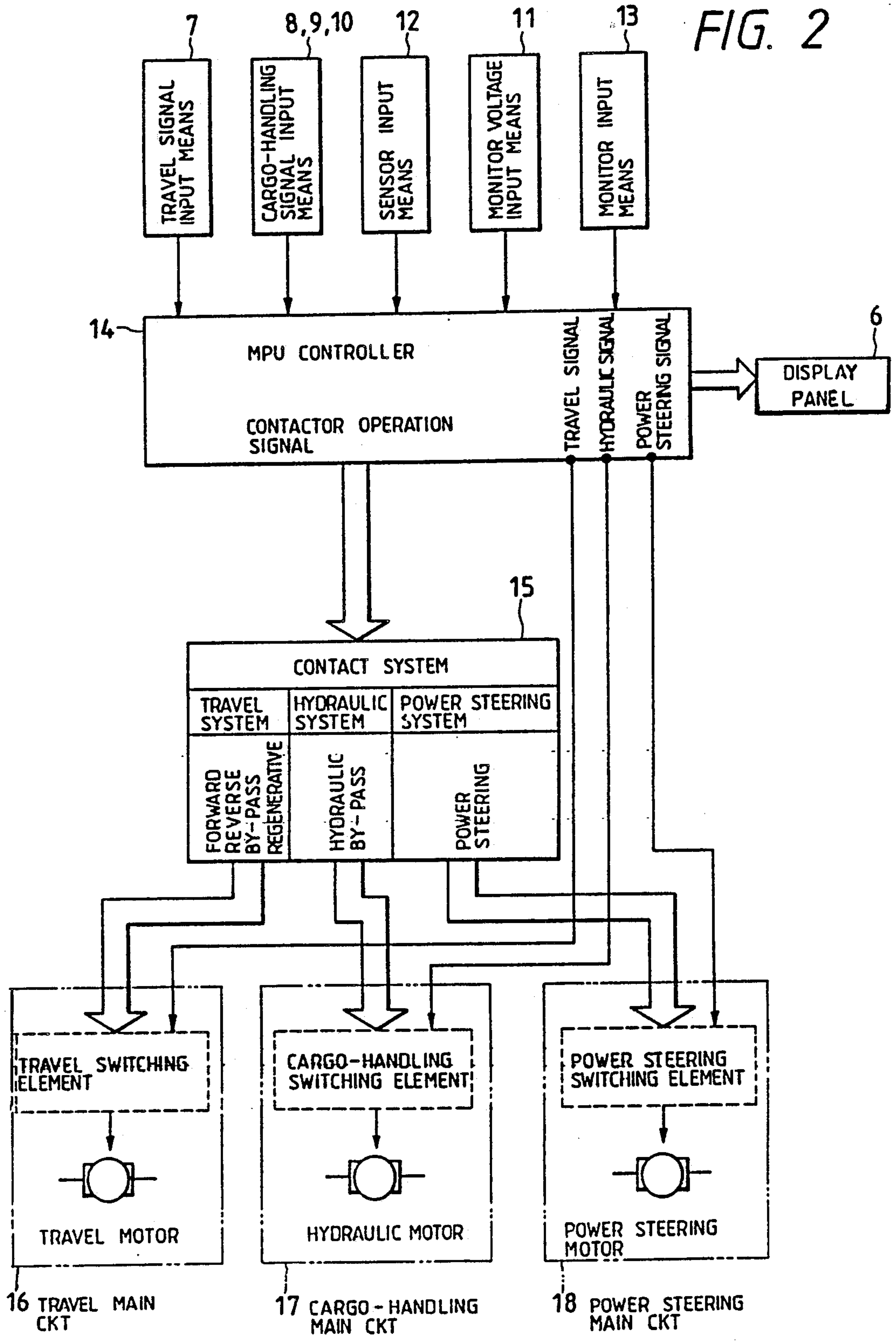
FIG. 2 shows a block diagram of a control system used in the fork-lift truck of FIG. 1.

FIG. 2 shows a block diagram of the control system of the fork-lift truck of FIG. 1. Travel signal input means 7 is arranged to control travel speed in accordance with a tilt angle of an accelerator (referred to as a travel lever), which is located near a driver seat on the upper side of the body 1.

Cargo-handling signal input means 8, 9 and 10 are constructed with a plurality of cargo-handling operation levers located near the driver seat on the upper side of the body 1. The means 8 is a lift lever for lift operation; the means 9, a reach lever for reach operation; the means 10, a tilt lever for tilt operation. The lift, reach and tilt operations are performed by manually operating these levers.

Reference numeral 11 designates a monitor voltage input means; 12, sensor input means; 13, monitor input means; 14, a MPC controller which receives the output signals of the above means and produces given control signals; 15, a contactor system containing a group of contactors, such as a travel system contactor, a cargo-handling contactor, and a power steering contactor. The contactor system 15 operates under control of control signals outputted from the MPU controller 14.

Reference numeral 16 designates a travel main circuit; 17, a cargo-handling main circuit; 18, a power steering main circuit.

Figure 3:
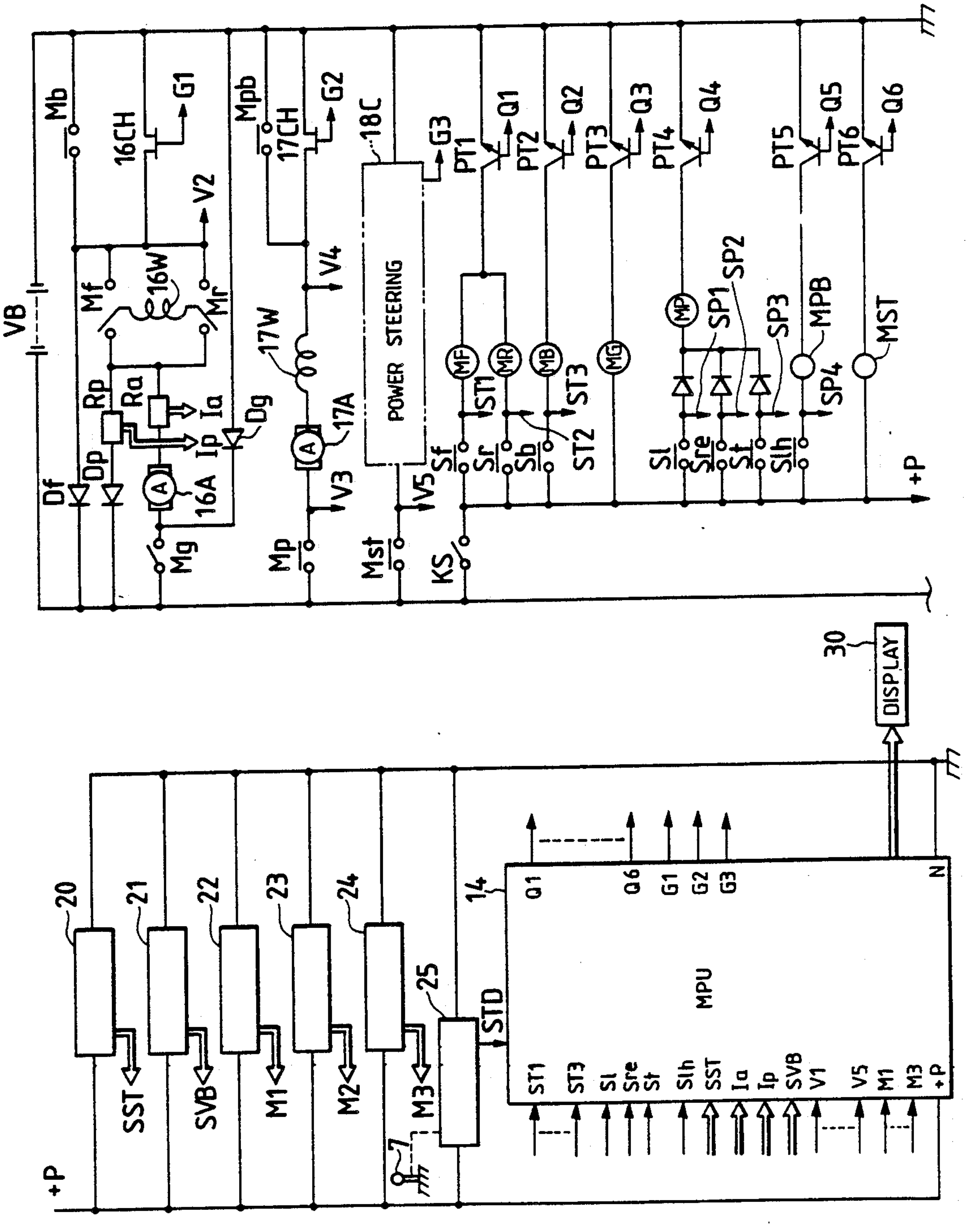
FIG. 3 is a circuit diagram showing details of the control section of the control system of FIG. 2.

FIG. 3 is a circuit diagram showing the details of a control section of FIG. 2. The travel main circuit 16 is arranged as described below. Reference numeral 16A designates an armature of a travel motor; Mg, a contact of a regenerative/power travel select contactor; 16W, a field winding for the motor; Mf and Mr, contacts of a forward contactor and a reverse selector contactor by which the polarity of the field winding 16W is changed; 16CH, a switching element for controlling the duty cycle a current fed to the motor in a regenerative mode and in a power travel mode. These components are coupled to battery BA. A plugging diode Dp allows a plugging current Ip to flow in armature 16A only when the motor in reverse. A plugging current detect resistor Rp detects the amplitude of plugging current Ip. An armature current detect resistor Ra is connected in series to the armature 17A and detects the amplitude of plugging current Ip. A regenerative diode Dg allows a regenerative current in a regenerative mode. Mb represents a by-pass contact.

The cargo-handling main circuit 17 is arranged as described below. Numeral reference 17A designates an armature of a cargo-handling hydraulic motor (hereinafter referred to as a hydraulic motor); 17B, a field winding of the hydraulic motor; 17CH, a cargo-handling switching element which is driven by a control signal from the MPU controller 14 through microswitches S1, Sre, and St. The switches are operated by tilting the cargo-handling lever. Those components are connected in series. Mpb is a contact of the cargo-handling by-pass contactor, which is connected in parallel to the cargo-handling switching element 17CH.

The power steering main circuit 18 is arranged as described below. Mst designates a contact operated by a power steering control signal outputted from the MPU controller 14. 18C is a power steering control circuit. When a key switch KS is operated, the contacts connected to the +P line are enabled.

Sf designates a forward microswitch operated when the travel lever 7 is tilted to a forward position; Sr a reverse microswitch operated when the lever 7 is tilted toward a reverse position. When the lever 7 is tilted toward the forward position, the switch Sf operates to send a signal to the MPU controller 14. In turn, the controller 14 produces an output signal, which in turn is applied to the base Q1 of a travel transistor PT1. Then, the transistor PT1 energizes an exciting coil MF of the forward contactor, that is connected in series to the forward microswitch Sf. The fork-lift truck then starts to travel forward.

When the lever 7 is tilted toward the reverse position, the switch Sr operates to send a signal to the MPU controller 14. The controller 14 produces an output signal, which is applied to the base Q1 of the travel transistor PT1. Then, the transistor PT1 energizes an exciting coil MR of the reverse contactor connected in series to the forward microswitch Sr. The fork-lift truck then starts to travel in reverse.

When the lever 7 is turned to its full position, the by-pass microswitch Sb operates. Then, this switch sends a signal to the MPU controller 14. An output signal of the controller 14 is applied to the base Q2 of the by-pass transistor PT2. In turn, the transistor PT2 energizes an exciting coil MB of the by-pass contactor connected in series to the by-pass microswitch Sb. By-pass travel of the fork-lift truck then starts.

MG designates an exciting coil of the regenerative/-power travel select contactor. When the lever 7 is turned to one side, an output signal of the controller 14 is applied to the base Q3 of the regenerative/power travel select transistor PT3. A circuit to exercise a power travel then operates. When the plugging current Ip exceeds a preset value within a period from the start of powered travel, the controller 14 stops a control signal to be applied to the base Q3 of the transistor PT3. This will be described in detail later. Accordingly, the transistor TP3 is turned off and the exciting current flowing into the exciting coil MG stops. A contact Mg of the regenerative/power travel select contactor is then opened and the operation of the fork-lift truck shifts to a regenerative mode.

S1 denotes a lift microswitch operated when the lift lever 8 is tilted; Sre, a reach microswitch operated when the reach lever 9 is tilted; St, a tilt microswitch operated when the tilt lever 10 is tilted. Those components are connected in parallel through reverse current block diodes D. An exciting coil MP of the cargo-handling contactor is connected in series to a cargo transistor PT4.

When the lift lever 8 is tilted, the lift microswitch S1 operates to send a signal to the MPU controller 14. The controller in turn sends a signal to the base Q4 of the transistor PT4. Exciting coil MP is then energized.

A cargo bypass microswitch S1h is not operated until the lift lever 8 is turned fully. When the lever 8 is turned so, the microswitch S1h operates to send a signal to the controller 14. Then, the controller 14 sends a signal to the base Q5 of the cargo bypass transistor PT5. The transistor energizes the exciting coil MPB. A contact Mpb of the cargo bypass contactor operates to short the cargo switching element 17CH.

A power steering auxiliary circuit is arranged as described below. An exciting coil MST of a power steering control contactor is connected in series to a power steering transistor PT6. A signal, which is outputted from a power steering sensor 20 when a steering handle 5 is operated, is inputted to the MPU controller 14. The controller sends a signal to the base Q6 of the transistor PT6. Then, a contact Mst of the power steering control contactor is closed. The power steering control circuit 18C starts to operate.

The sensor input means contains a power steering sensor 20, a battery voltage sensor 21, a battery liquid level sensor 22, an oil float sensor 23, and a hydraulic sensor 24. The sensor detects a tilt angle of the travel lever 7. A travel accelerator angle data means 25, which controls a travel speed of the truck in response to the output signal of the sensor, is connected as an input means to the controller 14.

The MPU controller 14 receives the output signals of the various types of sensors, and the operating signals from the various types of input means, and produces individually contact operation signals (Q1 to Q6), a travel chopper gate signal (G1), a cargo chopper gate signal (G2), a power steering chopper gate signal (G3), and monitor display signals or produces concurrently some of those signals.

Operation of the fork-lift truck during concurrent travel and cargo-handling operations (cargo-handling operation depends mainly on the hydraulic operation, and hence it will be referred to an hydraulic control) does not cause ON pulses G1 and G2 to overlap as described with reference to FIG. 4. For comparison, corresponding operation of a conventional system is illustrated in FIG. 5.

Figure 4:
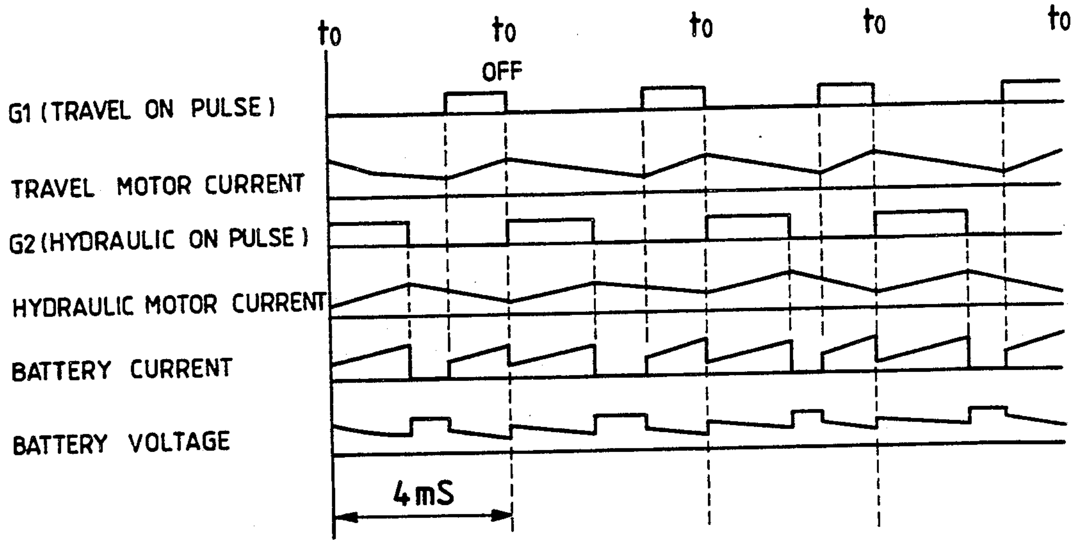
FIG. 4 shows a timing diagram useful in explaining fork-lift truck operation when travel and cargo-handling operations are concurrently performed.
Figure 5:
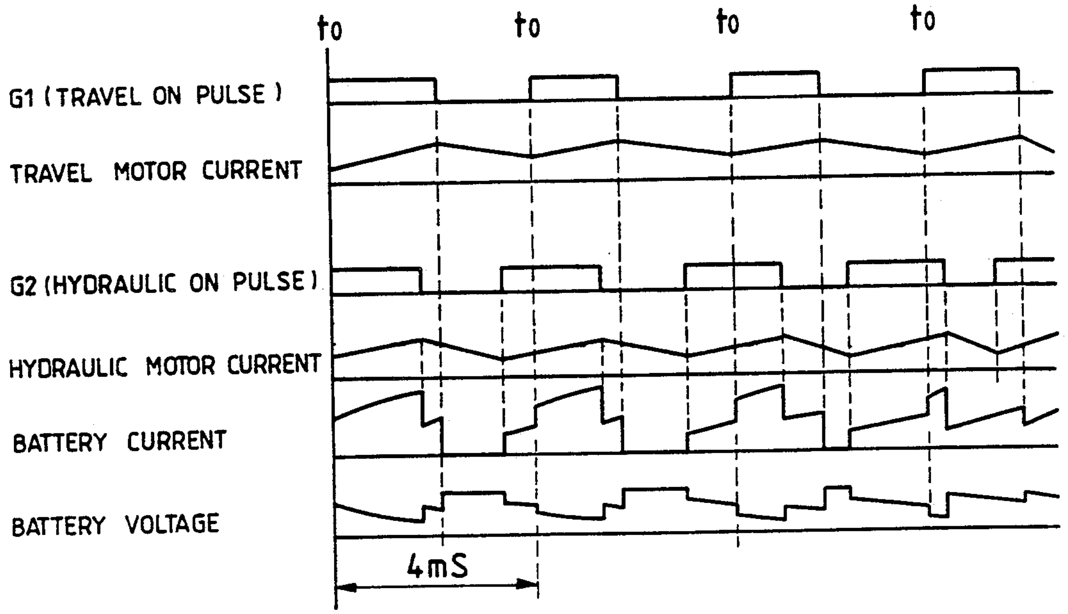
FIG. 5 PRIOR ART
FIG. 5 shows a timing diagram useful in explaining conventional fork-lift truck operation when travel and cargo-handling operations are concurrently performed.

As shown in the timing chart of FIG. 4, a pulse width modulation (PWM) system is employed. ON pulses G1 and G2 are synchronized with each other in a fixed period (4 ms, in this instance). An OFF point of k travel control pulse is positioned at a reference time point "to" in the fixed period, while an ON point of the hydraulic control pulse is positioned. Accordingly, an ON point of the travel control pulse is located before the reference time point "to", and an OFF point of the oil pressure control pulse is located after the time point "to".

A travel motor current, an oil pressure motor current, a battery current, and a battery voltage are as shown in FIG. 2. When a large current is consumed, for example, when the fork-lift starts up, a current control operates to limit the width of each ON pulse so as to prevent the ON periods of the pulses from overlapping. In a stationary state, the currents of the travel motor and the hydraulic motor are small. Accordingly, the ON width of the pulse is widened, and the ON periods may overlap. If they do overlap, they do so only slightly. Battery voltage therefore drops only slightly and no problem arises.

If required, the ON point of the travel control pulse may be set at the reference time point "to" and the OFF point of the hydraulic control pulse may be set at the time point "to".

A time chart describing an operation of the fork-lift truck based on a conventional control system in which the pulse generation timings are not synchronized with each other, is shown in FIG. 5. As shown, during a period that the pulses G1 and G2 overlap, the current is simultaneously applied to the travel motor and the hydraulic motor. Accordingly, battery current increases tremendously and battery voltage drops significantly.

As seen from the foregoing description, the control system according to the present invention prevents the ON pulses from overlapping to such a large degree. Accordingly, a large drop in battery voltage will never occur. Then, a voltage drop in the main circuit is small. Accordingly, the problem of having a battery voltage drop and insufficient motor drive power is avoided. No large current consumption ensures a long lifetime of the battery.

Figure 6:
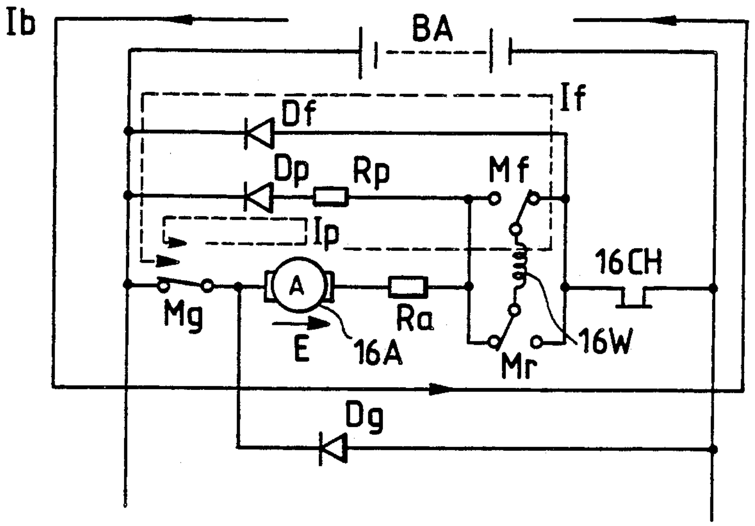
FIG. 6 depicts operation of the main travel circuit when a power travel mode is switched to a regenerative mode.

The control system according to the present invention also features switching between the power travel mode and the regenerative mode. This feature will be described with reference to FIG. 6. Immediately after the travel lever 7 is turned in a direction, the MPU controller !4 sets up an operation mode like the normal power travel mode, as shown in FIG. 6. It turns on the contact Mf of the forward contactor in addition to the contact Mg of the regenerative/power travel select contactor. Then, it applies the same ON pulse as that in the normal power travel mode to the travel switching element 17CH. Consequently, a current Ib flows from the battery BA to the armature 17A. During the following OFF period, when the travel motor reverses its rotation, a voltage is induced in the right direction in the armature 17A thereby allowing regeneration. As a result, as indicated by a broken line, a plugging current Ip flows in a closed loop consisting of the plugging diode Dp and the contact Mg (closed) of the contactor. Accordingly, determining whether operation will proceed in the regenerative mode or the power travel mode is accomplished by checking whether or not the plugging current Ip exceeds a preset level within a predetermined period (to be given later). If it exceeds the preset level, control determines that the regenerative mode is allowed, contact Mg is opened, and regenerative control begins. If it is below the preset level within that period, control determines that the power travel mode is allowed, and power travel control continues.

Figure 7:
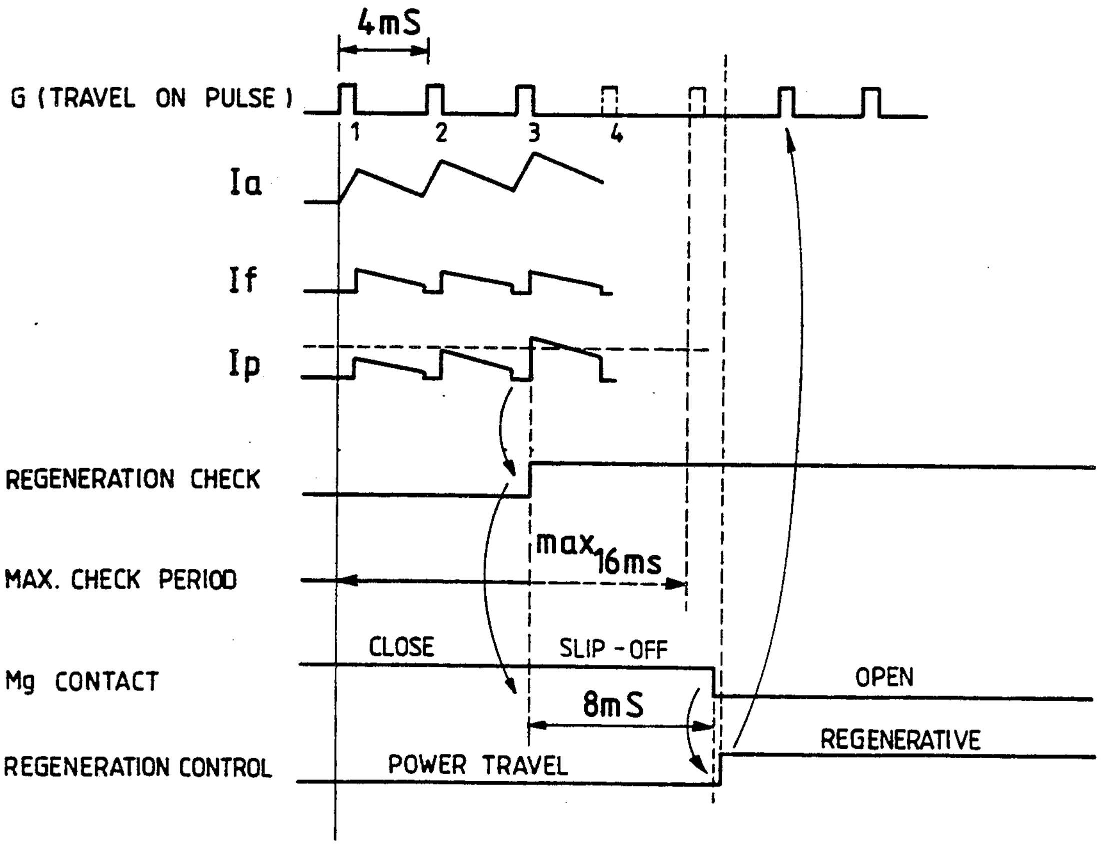
FIG. 7 is a timing chart useful in explaining the mode switching operation of FIG. 6.

The regenerative/power travel check operation will be described with reference to FIG. 7 showing a timing chart. When lever 7 is operated, the controller 14 produces an ON pulse G of a fixed period within a pulse period 4 ms. In synchronism with this, the armature current Ia flows during the ON period. The exciting current If and the plugging current Ip, on the other hand, flows during the OFF period, as shown. In this instance, the plugging current Ip exceeds the preset value immediately after the third pulse G. Accordingly, control determines that the regenerative mode is allowed. Upon this determination, the contact Mg is opened. During the 8 ms period required to open the contact, the pulse G is disabled. The period for the regenerative/power travel check is a fixed period immediately after the ON pulse G is generated by operating the travel lever 7, e.g., 16 ms or less. Subsequently, control based on the result of the determination (the control of the regenerative mode or the power travel mode) is performed. After this regenerative determination is made, the check period terminates.

For the OFF period of the travel switching element 17CH, the armature current Ia is expressed by:

$$Ia=Ip+If$$

where Ip is the plugging current and If is the exciting current.

If the travel motor is not reversed, on the other hand, Ip=0 (zero) and Ia=If. If it is reversed (regenerative), Ip<>0 (zero), the plugging current Ip is proportional to the induced voltage E of the armature, and is:

$$Ip=E/rA$$

The induced voltage E is:

$$E=k\times If\times N$$

where K is proportional constant, and N is the number of revolutions. Thus, the magnitude of the plugging current Ip is proportional to the accumulated number of revolutions. For example, the plugging current will exceed the preset level after one pulse when the motor runs at high speed, after two to three pulses when it runs in reverse at medium speed, and after three to four pulses when it runs in reverse at low speed. If the pulse period is 4 ms, the regeneration determination usually occurs within 4 to 16 ms. In the high speed reverse run of the motor requiring a steep deceleration response, the determination is made within 4 ms.

Because the slip-off time of the contact Mg is 8 ms, a switch time to the regenerative mode in the high speed reverse run, is 4+8=12 ms. A maximum switch time in the low speed run is 16+8=24 ms. Thus, a high response switching to the regenerative mode is realized at either speed.

During power travel acceleration, there is no time lag. High response control of the fork-lift truck is therefore accomplished. Additionally, the plugging current Ip flows only when the motor runs in reverse, ensuring a reliable determination.

An embodiment of the present invention saves electric power consumed in the exciting coil of a contactor by chopper-controlling the coil. This embodiment is described with reference to FIGS. 8 and 9. In the circuit shown in FIG. 8, an exciting voltage of the exciting coil MF (forward) or the exciting coil MR (reverse) of the travelling contactor is detected by a comparator 19. The detected signal is applied through an A/D converter 20 to an MPU controller 14. A chopper duty ratio is selected so that a full voltage is applied to the exciting coil during a predetermined period from the instant that the exciting of the exciting coil starts. Subsequently, a voltage Vs slightly higher than a minimum contact hold voltage is maintained. The travelling switching element 17CH is controlled by an output signal of the controller 14. This control depends on the chopper duty ratio. Thus, in the FIG. 8 circuit, the exciting current of the coil MF (forward) or MR (reverse) is detected and the exciting coil voltage is controlled and maintained at a fixed value. In the circuit of FIG. 9, battery voltage variation is directly detected. By using the detected battery voltage, the chopper duty ratio is appropriately corrected and consequently the exciting coil voltage is maintained at a fixed value.

A monitor display additionally featuring the present invention is described. The monitor display provides a message of management information using characters, for example, when the fork-lift truck operates normally, and provides a trouble message by characters and the like for each symbol representing various monitor locations when the truck is operating abnormally.

A display board for such displays is shown in FIG. 10. A display of FIG. 10 is for the normal fork-lift truck. A battery liquid level indicator 29 is a level meter using a plurality of LEDs. A monitor display 30 is constructed with an LCD. Seven symbols 31 to 37 under the monitor display indicate items to be checked in daily inspection or when the truck is operated. When the truck is operating normally, a character display line 38 displays a message of management information such as an hour meter by alphanumeric and/or Japanese characters. A message of a trouble is displayed in FIG. 11. In this instance, a fuse in an oil-pressure circuit is burned out. In this case, the indicator 32 attendant with "HYD" representing a hydraulic system flickers to give an alarm. At the same time, a detailed message "Fuse in hydraulic system" indicating a trouble location is also displayed. The message flows from left to right when displayed. Display of up to ten digits is possible.

The control of the above display is performed at the input/output of the MPU control 14.

What is claimed is:

1. A control system for controlling an industrial use vehicle powered from a power source, comprising:
   - a travel signal input means for generating an output signal indicative of the position of a travel accelerator;
   - cargo-handling signal input means for generating a cargo-handling output signal indicative of the position of cargo-handling signal input means;
   - a travel circuit for causing the vehicle to move in at least a forward direction and a reverse direction, the travel circuit outputting a signal indicative of the magnitude of a current flowing in a travel motor armature of a travel motor;
   - a cargo-handling circuit for causing cargo to be manipulated by the vehicle; and
   - a controller for generating predetermined control signals to control the travel circuit and the cargo-handling circuit, the control signals being generated according to the output signals of said travel signal input means and said cargo-handling signal input means, the controller causing the travel circuit to switch into a regenerative brake mode to redirect current flowing in the travel motor armature back into the power source when the direction of travel indicated by the travel signal input means is changed and when the magnitude of the current flowing in the travel motor armature exceeds a predetermined amount.

2. The control system of claim 1 wherein the power source is a battery which is recharged during said regenerative brake mode.

3. The control system of claim 1 wherein the travel circuit further comprises a travel switch for causing current from the power source to flow through the armature during an ON period when the travel switch is on, wherein the cargo-handling circuit also has an ON period during which current from the power source flows through the cargo-handling circuit, said controller defining a series of fixed time periods in relation to which the controller controls the travel circuit and the cargo-handling circuit through said control signals.

4. The control system of claim 3 wherein each of said fixed periods has a start and an end, the ON period of either the travel circuit or the ON period of the cargo-handling circuit beginning at the start of the fixed period, the other ON period ending at the end of the fixed period.

5. The control system of claim 4 wherein the travel circuit further comprises a plugging current detector which is connected in parallel with said travel motor armature, the controller determining whether the current flowing through the travel motor armature is greater than said predetermined amount by monitoring the magnitude of the current flowing through the plugging current detector during the portion of said fixed periods in which said travel switch is off.

6. The control system of claim 5 in which said plugging current detector comprises a diode and a resistor arranged in series.

7. The control system of claim 1 further comprising monitor voltage input means for detecting a voltage at each of a plurality of monitor points and for outputting signals indicative of the detected voltages to the controller, the controller having a self-check function which analyzes the output signals from the monitor points and which displays the results of the self-check function on a display.

8. A control system for controlling an industrial use vehicle powered from a power source, comprising:

a travel signal input means for generating an output signal indicative of the position a travel accelerator;

cargo-handling signal input means for generating a cargo-handling output signal indicative of the position of cargo-handling signal input means;

a travel circuit for causing the vehicle to move in at least a forward direction and a reverse direction, the travel circuit comprising a travel switch for causing current from the power source to flow through a travel motor armature during an ON period when the travel switch is on;

a cargo-handling circuit for causing cargo to be manipulated by the vehicle, the cargo-handling circuit having an ON period during which current from the power source flows through the cargo-handling circuit; and a controller for generating predetermined control signals to control the travel circuit and the cargo-handling circuit, the control signals being generated according to the output signals of said travel signal input means and said cargo-handling signal input means, the controller defining a series of fixed time periods in relation to which the controller controls the travel circuit and the cargo-handling circuit, each of said fixed time periods having a start and an end, the ON period of either the travel circuit or the ON period of the cargo-handling circuit beginning at the start of each fixed period, the other ON period ending at the end of each fixed period so that the travel switch ON period and the cargo-handling ON period coincide for a minimum amount of time.

9. The control system of claim 8 wherein the power source is a battery.

10. The control system of claim 8 wherein the travel circuit outputs a signal indicative of the magnitude of a current flowing in the travel motor armature, the controller causing the travel circuit to switch into a regenerative brake mode to redirect current flowing in the travel motor armature back into the power source when the direction of travel indicated by the travel signal input means is changed and when the magnitude of the current flowing in the travel motor armature exceeds a predetermined amount.

11. The control system of claim 10 in which said power source is a battery which is recharged during said regenerative brake mode.

12. The control system of claim 1 further comprising monitor voltage input means for detecting a voltage at each of a plurality of monitor points and for outputting signals indicative of the detected voltages to the controller, the controller having a self-check function which analyzes the output signals from the monitor points and which displays results of the self-check function on a display.

13. A control system for controlling an industrial use vehicle, comprising:

monitor voltage input means for detecting a voltage at each of a plurality of monitor points and for outputting signals indicative of the detected voltages;

sensor input means for generating an output signal from each of a plurality of sensors;

a display; and a controller for controlling the industrial use vehicle, the controller having a self-check function which analyzes the output signals from the monitor voltage input means and the sensor input means, the controller outputting results of the self-check function on the display in a symbolic pictorial format, the controller simultaneous outputting more detailed results of the self-check function on the display in an alphanumeric format.

14. The control system of claim 13 wherein the vehicle is a battery powered fork lift, said symbolic pictorial format including a symbol representative of a battery.

15. The control system of claim 13 wherein the vehicle is a battery powered hydraulic fork lift, said symbolic pictorial format including a symbol representative of a hydraulic fuse.

16. A control system for controlling an industrial use vehicle powered by a battery, comprising:

a travel circuit for controlling movement of the vehicle;

a cargo-handling circuit for controlling manipulation of cargo;

a power steering circuit for controlling steering of the vehicle; and a microprocessor controller for controlling the travel circuit, the cargo-handling circuit, and the power steering circuit, said controlling occurring in part by controlling electrically operated contacts, the microprocessor controller supplying a fixed average exciting voltage to the electrically operated contacts by controlling a duty ratio with which a switch located between the battery and the electrically operated contacts is turned on and off.

17. The control system of claim 16 wherein the microprocessor controller monitors the fixed average exciting voltage with an A/D converter and wherein the microprocessor controller maintains the fixed average exciting voltage despite the voltage of the battery varying.

18. The control system of claim 16 wherein the microprocessor controller monitors the voltage of the battery with an A/D converter and wherein the microprocessor controller maintains the fixed average exciting voltage despite the voltage of the battery varying.

* * * * *